United States Patent [19]

Huignard et al.

[11] Patent Number: 4,543,662
[45] Date of Patent: Sep. 24, 1985

[54] OPTICAL BEAM SWITCHING DEVICE AND TELEPHONE EXCHANGE COMPRISING A DEVICE OF THIS KIND

[75] Inventors: Jean Pierre Huignard; Bertrand LeDu, both of Paris, France

[73] Assignee: Thomson-CSF, Paris, France

[21] Appl. No.: 423,316

[22] Filed: Sep. 24, 1982

[30] Foreign Application Priority Data

Dec. 18, 1981 [FR] France .................. 81 23729

[51] Int. Cl.$^4$ .................................. H04B 9/00
[52] U.S. Cl. .......................... 455/600; 350/3.62
[58] Field of Search .......... 350/3.62, 3.64, 3.78; 455/600

[56] References Cited

U.S. PATENT DOCUMENTS

| | | | |
|---|---|---|---|
| 3,614,192 | 10/1971 | Preston, Jr. ............... | 350/3.7 |
| 3,831,035 | 8/1974 | Hill ......................... | 350/3.78 |
| 3,985,975 | 10/1976 | Steensma ................... | 350/3.68 |
| 4,383,734 | 5/1983 | Huignard et al. .......... | 365/123 |
| 4,403,352 | 9/1983 | Huignard et al. .......... | 455/601 |

FOREIGN PATENT DOCUMENTS

| | | | |
|---|---|---|---|
| 0053957 | 6/1982 | European Pat. Off. ....... | 365/123 |
| 2243573 | 9/1973 | France ..................... | 455/600 |
| 2385266 | 3/1977 | France ..................... | 250/578 |

*Primary Examiner*—Marc E. Bookbinder
*Assistant Examiner*—Timothy K. Greer
*Attorney, Agent, or Firm*—Cushman, Darby & Cushman

[57] ABSTRACT

The invention relates to switches enabling the connection by an optical method of at least one of the circuits of a set of input circuits to at least one circuit of a set of output circuits. It consists in illuminating a photosensitive medium with parallel input beams coming from a set of input circuits. The input beams are then diffracted on strata inscribed on the medium to reach one of the circuits of a set of photoreceptor circuits. The strata are inscribed by interference of two inscribing beams of which the wavelength differs from that of the input beams; the wavelength of these input beams not lying within the range of spectral sensitivity of the photosensitive medium.

10 Claims, 13 Drawing Figures

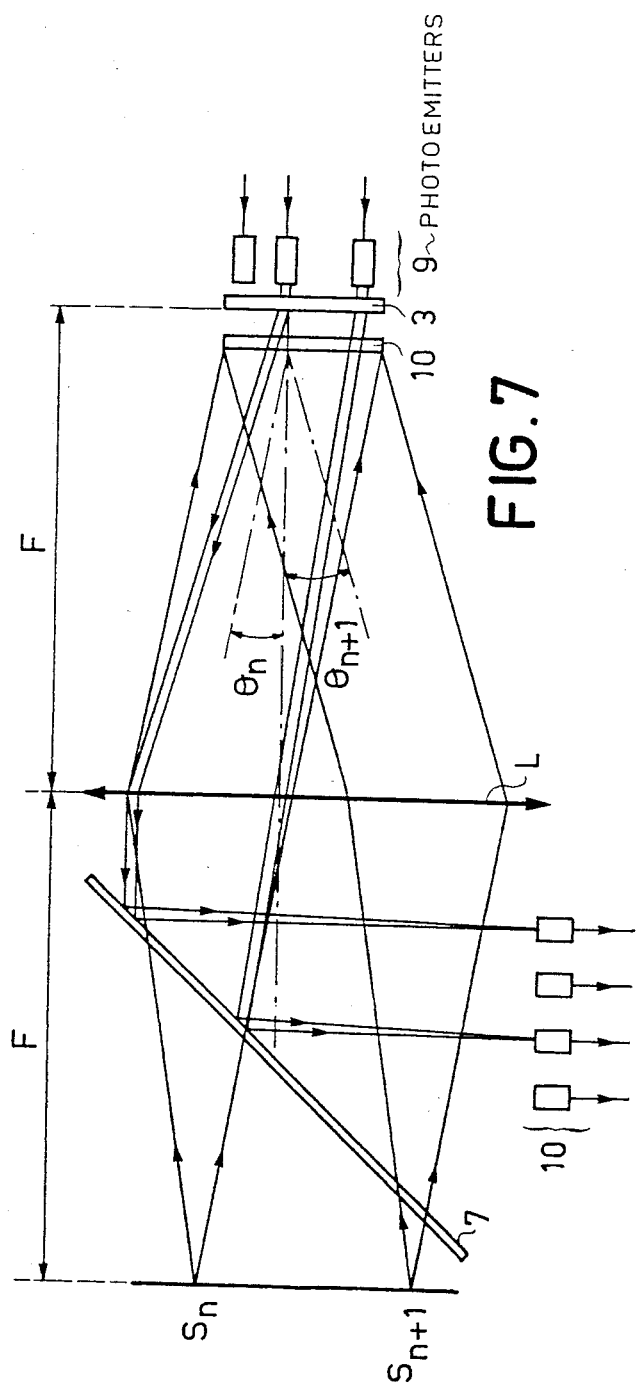
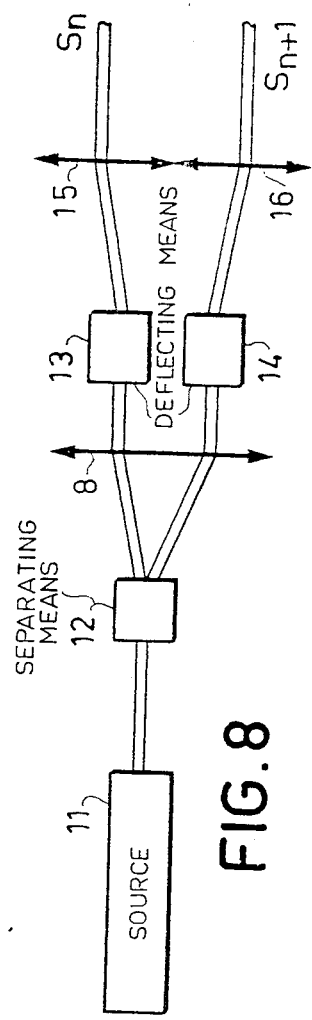
FIG. 7
FIG. 8

OPTICAL BEAM SWITCHING DEVICE AND TELEPHONE EXCHANGE COMPRISING A DEVICE OF THIS KIND

BACKGROUND OF THE INVENTION

The present invention relates to electrooptical switching devices which permit connecting photoemitter input units to photoreceptor output units by optical connectors modifiable under the action of external electric control signals. The application of these devices to telephone switching operations leads to obtaining a telephone exchange in which the interconnection of subscribers' lines is performed without moving electrical contacts. The sphere in question thus consists of the techniques for the spatial switching of beams coming from single-mode or multimode optical fibres, for example.

A prior art device described in the French patent application published under the No. 2 495 873. relates to switches enabling connection by an optical method between at least one of the circuits of a set of input circuits to at least one circuit of a set of output circuits. It consists of illuminating a photosensitive medium with parallel beams emerging from a matrix of input circuits. The beams are then diffracted on strata inscribed in the medium to reach one of the circuits of a matrix of photoreceptor circuits. The strata are inscribed by interference between two beams of which the wavelength differs from that of the input beams; the wavelength of these input beams not being situated within the range of spectral sensitivity of the photosensitive medium. The inscribing of the strata which ensures switching between any two subscribers is performed by means of two beams emerging from a laser. Since the photosensitive material utilized is thick, the wavelength change between the inscription and read-out enforces positioning the recording beams under particular incidences. During the read action, this ensures the deflection of the beam towards the required circuit of the output matrix. The device providing inscription of the grid of strata comprises a double deflection system XY whose task is to pick an optional point in the switching plane and to position the beam with the required incidence on the crystal; this beam thus pivoting around a selected point in the plane of the crystal.

The drawback of this prior art device consists of the difficulty of adjusting the angles of incidence of the recording beams in the photosensitive medium.

The present invention is also based on the angular deflection of the beam by a grid of strata photoinduced in a photosensitive medium. However, it provides a notable simplification of the optical layout for inscription and reading the grids of strata of variable pitch and diffracting the beams under Bragg conditions as compared to the prior art device.

In order to eliminate the disadvantage of the prior art device, the photosensitive medium is actually illuminated in an uniform manner in the present invention, a bidimensional spatial modulator permitting selection of one of the photoemitter circuits.

SUMMARY OF THE INVENTION

The invention provides an optical beam switching device intended to connect, by optical means, at least one of the circuits of a set of photoemitter circuits to at least one circuits. of a set of photoreceptor circuits, The invention comprises means for generating two inscribing light beams, the generating means comprising two light sources, and means for deflecting the radiation transmitted by the photoemitter circuit previously made parallel by collimator means. The deflector means enables the radiation to be directed at the active part of the corresponding photoreceptor circuit and is formed by a diffraction grating inscribed in a photosensitive medium and obtained by interference between the two inscribing light beams. The two inscribing light beams generate the diffraction grating in the photosensitive medium having a different wavelength from that of the beams coming from the photoemitter circuits. The wavelength of the radiation transmitted by the photoemitter circuit does not lie within the range of spectral sensitivity of the photosensitive medium. The photosensitive medium, in which the diffraction grating is a three-dimensional grating of strata, is continuously recyclable and the two inscribing light beams are plane wave beams, uniformly illuminating the photosensitive sensitive medium in each case. A bidimensional spatial modulator is positioned along the trajectory of the inscribing beams, between the light sources and the photosensitive medium, the modulator rendering it possible to select limited areas in which are inscribed diffraction grids.

The invention also relates to an automatic telephone exchange making use of such a switching device.

BRIEF DESCRIPTION OF THE DRAWINGS

A clearer understanding of the invention will be obtained from the following description taken in conjunction with the accompanying drawings, in which:

FIGS. 7 and 8 illustrate two particular features of the said device.

DETAILED DESCRIPTION OF THE INVENTION

Figure 1:
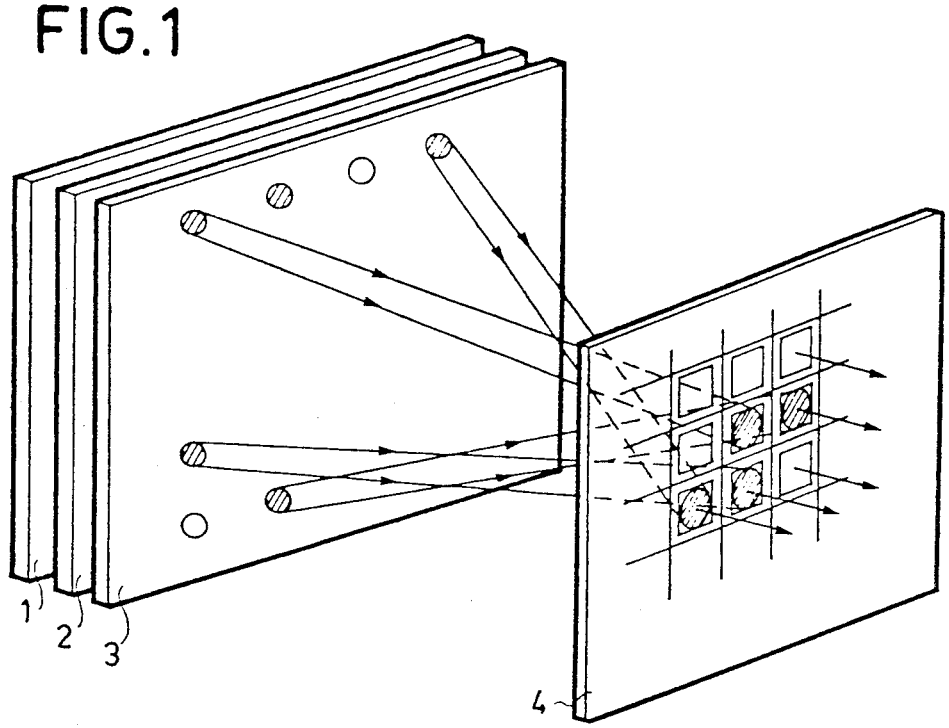
FIGS. 1 and 2 illustrate a partial diagram of one embodiment of a device according to the invention.
Figure 2:
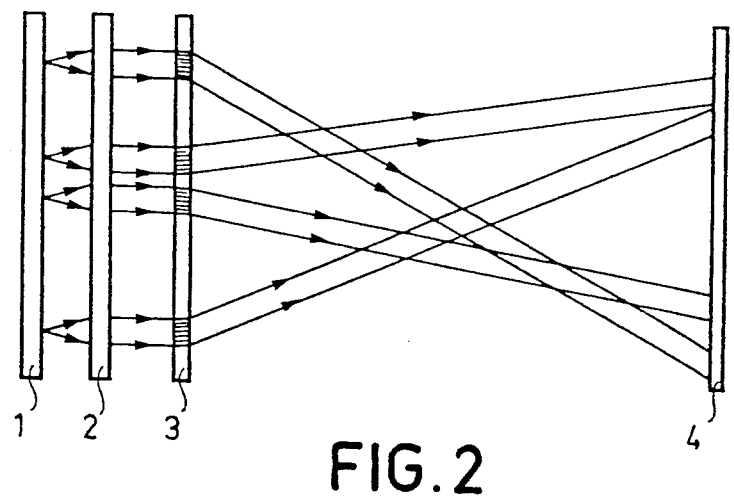

FIGS. 1 and 2 illustrate different circuit matrices. The light means coming from matrix 1 of the photoemitter circuits are made parallel by passing through a matrix of microlenses 2. These beams are then diffracted on strata inscribed in the medium 3 to reach different circuits of the matrix 4 of photoreceptor circuits. Having been inscribed in a thick photosensitive medium, these strata consequently form planes parallel to the bisector plane of the incident wave surfaces which, by interference, permitted inscribing these in this medium. A kind of "venetian blind" comprising equidistant strata is also established. In the present invention, this medium is an electrooptical photosensitive medium. This is a continuously recyclable medium. For example, it may be a high efficiency medium, of the bismuth-silicon oxide type (BSO).

The wavelength of the beams coming from the photoemitter circuits does not lie within the range of spectral sensitivity of the medium, it is situated for example within the infra-red range. The transmission matrix 1, is thus formed by a grid of m x n modulable light sources, collimated by means of a grid 2 of microlenses or focussing fibres of the index gradient type, for example. The beams thus generated are placed in alignment with a board 3 of BSO material acting as a carrier for the recording of strata gratings of appropriate pitch and orientation. These grids are inscribable and erasable. The reading of the grating not being destructive regarding the wavelengths in question, the incident beam is consequently deflected towards the address required and read on a matrix of photodetectors. The optical connection is thus established between two subscribers. The essential interest of the device derives from the possibility of the spatial crossing of all the light beams being propagated independently between all the points of the input matrices and output matrices 4.

The inscription of the strata which permits providing switching between two optional subscribers is performed by means of two beams coming from an He-Cd laser, for example.

By way of a non-limiting example, it may be assumed that the photoemitter circuits and the photoreceptor circuits are formed by optical fibre extremities, the microlenses of the matrix 2 being formed by index gradient lenses, for example.

Figure 3:
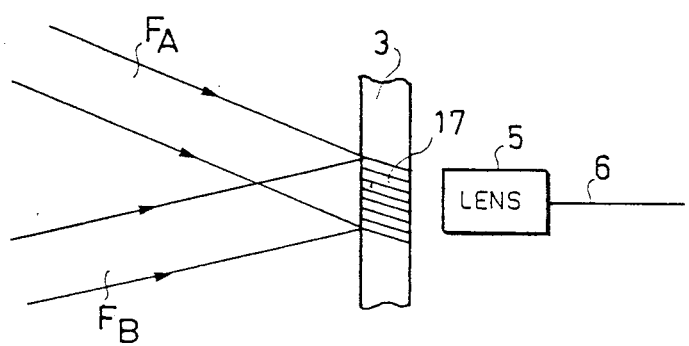
FIGS. 3 and 4 are explanatory diagrams of the operation of the device.
Figure 4:
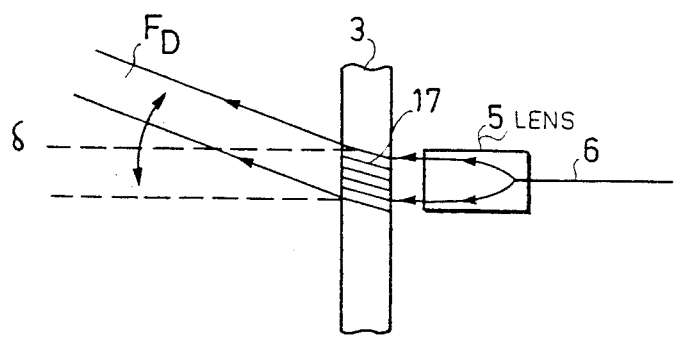

The operation of a spatial switching cell is illustrated in FIGS. 3 and 4; FIG. 3 illustrating the inscription and FIG. 4 the reading of the switching grids. The angular deflection of the beam coming from the optical fibre 6 is obtained by means of a strata grating recorded in a thick photosensitive material 3 which is inscribable and erasable. The gratings inscribed with varying pitch thus provide an angular deflection $\delta = (\lambda l/p)$, $\lambda l$ being the reading wavelength and p the pitch of the photoinduced grid. The grating is recorded and erased with a wavelength corresponding to the range of spectral sensitivity of the material utilized, for the BSO crystals, $\lambda_i \approx 450-550$ nm. The reading beam, undergoing but little absorption, does not affect the photoinduced index modulation, since the reading operation is not destructive. The pitch and the orientation of the strata of the grating consequently determine the direction of the beam deflected towards a particular subscriber. Since the grating is recorded in a thick photosensitive medium, the incidence of the inscribing beams FA and FB should be calculated so that the reading wave is diffracted in FD under Bragg conditions. One of the substantial difficulties linked with utilization of a deflection cell of this nature furthermore derives from the angular addressing precision required on the beams FA and FB used for recording. An index gradient lens is shown at 5.

Figure 5:
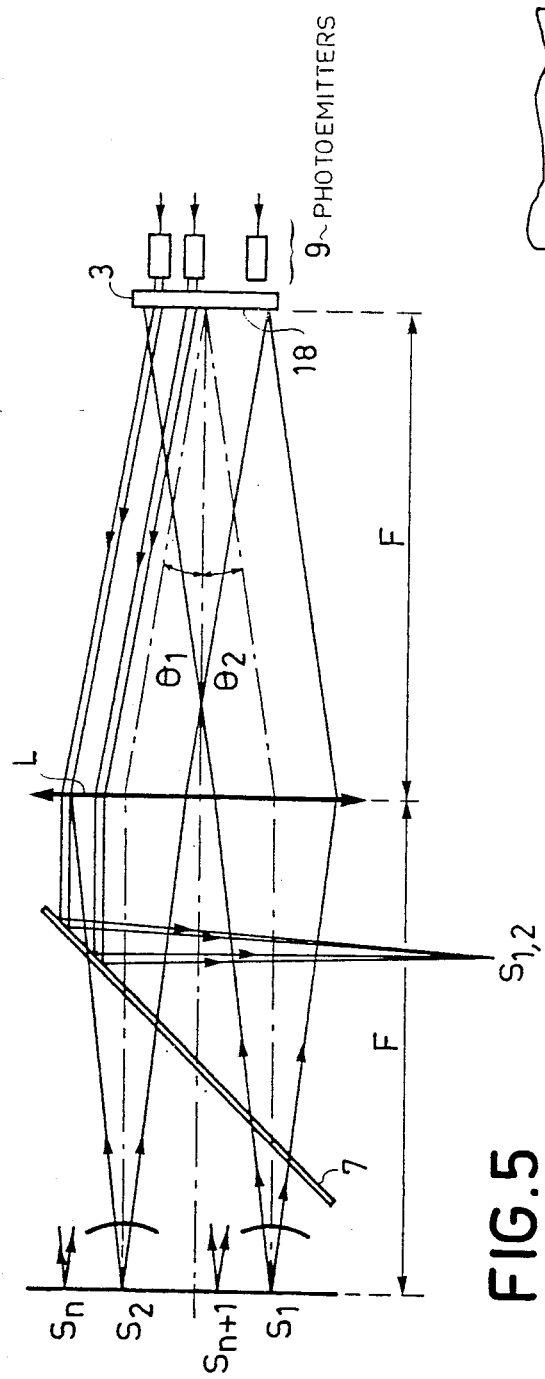
FIG. 5 illustrates a particular feature of the device according to the invention.
Figure 6:
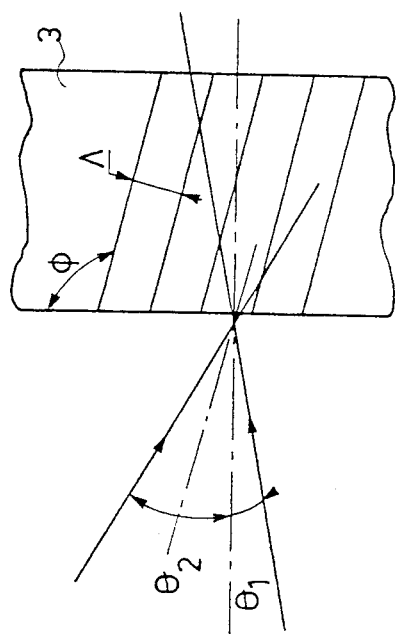
FIG. 6 is an explanatory diagram of the operation of the device, according to the invention.

The device for optical beam switching, according to the invention, for which the general operation has been set forth, is produced by means of a simple optical structure permitting spatial switching based on an ordered grid of fibres, for example. The photosensitive material carrying the holograph grid consists, for example, of a BSO monocrystal which is a photorefractive substance having photoinduced index variation, operating in the transverse electro-optical layout. According to the diagram of FIG. 5, the switching plane 18 situated in the focal plane of the lens is illuminated throughout its surface. Two plane waves sloping at angles $\theta_1$ and $\theta_2$ correspond, after traversal of the lens L, to any pair of recording sources $S_1$ and $S_2$ at the wavelength $\lambda = 514$ nm or $\lambda = 488$ nm, for example. These two waves undergo interference and within the volume of the photosensitive material create a system of interference strata of which the pitch and orientation are established by the values of the angles $\theta_1$ and $\theta_2$. For any beam coming from one of the transmitters, 9, the angular deflection is the same, and after traversal of L, the different elementary beams converge on the same point in each case, having the coordinates $S_{1,2}$. The deflection at another point requires inscription of a grating of different pitch, the position of the new recording sources $S_2$ and $S_3$ being calculated so that the grating induced in the BSO crystal equally diffracts under Bragg conditions for this new pitch value. According to this principle, it is thus possible to perform diffraction under Bragg incidence of the beam coming from the optical fibres by prepositioning the inscription sources $S_n - S_{n+1}$. The position of the sources $S_n$ and $S_{n+1}$ is deduced from the calculation. The pitch of the grating mainly consists of a function of the distance $S_n - S_{n+1}$, and the inclination of the strata providing the diffraction under Bragg conditions is provided by the value of the angles of inclination $\theta_n - \theta_{n+1}$. By way of example, FIG. 6 illustrates the position of the interference strata for a position $S_1 - S_2$ of the recording sources.

The strata grating is described by the following relationships:

the angle $\phi$ of inclination of the strata with respect to the input surface of the material is defined by the relationship:

$$\sin \phi = \cos \frac{(\theta_1 + \theta_2)}{2}$$

the pitch $\Lambda$ of the strata is defined by the relationship:

$$\Lambda = \frac{\lambda_i}{2\sin\left(\frac{\theta_2 - \theta_1}{2}\right)}$$

A spatial switching device is depicted in FIGS. 7 and 8. It comprises the following principal elements:

an inscription source 11 of the Argon laser type, for example, transmitting in the range of spectral sensitivity of the photosensitive material, of a wavelength $\lambda_i = 488$ nm, or $\lambda_i = 514$ nm for the BSO crystal; yielding an inscription energy $S^{-1} \approx 100 \ \mu Jcm^{-2}$;

means of separation 12 and of deflection 13 of the waves for the generation of the pair of sources such as $S_n$ and $S_{n+1}$ coherent between them;

a lens L utilized in the Fourier transformation layout;

a two-dimensional modulation grid 10 controllable as regards x—y by means of the voltage $V_x - V_y$;

a dichroic mirror 7 assuring the separation of the diffracted wave of wavelength $\lambda l = 800-900$ nm and the incident wave of wavelength $\lambda_i \approx 500$ nm.

Figure 9:
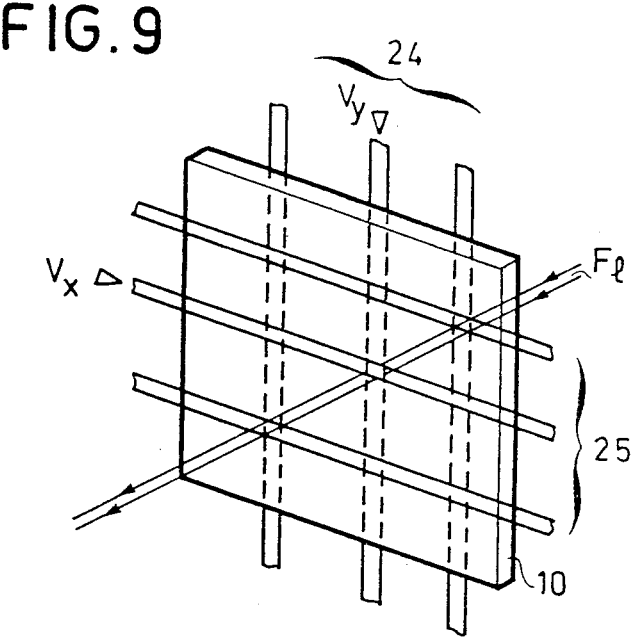
FIGS. 9 to 13 are explanatory figures for the operation of the device according to the invention.

The function of the two-dimensional spatial modulator is explained in FIG. 9. This modulator is illustrated in the form of a blade inserted between two series of transparent electrodes 24 and 25 situated at either side of the blade, the electrodes of each side being mutually parallel and directed at right angles to the electrodes of the other side. When no voltage is applied, the modulator acts as a barrier for the inscription beams ($\lambda_i \approx 450$ nm) and has a maximum transmission for the reading wavelength $\lambda_l$. By contrast, when a greater voltage than zero is applied, it has a maximum transmission for the inscription wavelength $\lambda_i$. This function thus allows isolation of the inscription material 3 from the inscription light to which it is sensitive. The inscription of the holographic grating assuring the switching action is thus performed in the following manner:

The subscriber is selected by application of the voltages $V_x - V_y$ to the two-dimensional modulator. This results in opening a transparent window 23 before the $x - y$ coordinate transmitter fibre.

Inscription sources $S_n$ and $S_{n+1}$ for example, are placed in position. The holographic switching grating is inscribed before the sole transmitter source $x - y$.

The pairs of sources $S_n$, $S_{n+1}$ for holographic marking are obtained from a single-mode laser, for example of the ionised Argon type. The usable wavelengths are then $\lambda = 514$ nm or $\lambda = 488$ nm.

As illustrated in FIG. 8, the sources $S_n - S_{n+1}$ are generated by deflection at 13 and 14 of the incident beams coming from one and the same laser source 11 after traversal of a beam separator 12, by means of, for example, optomechanical devices. The position of these sources, determined by the calculation, is such that the diffraction of the beams transmitted occurs under Bragg incidence irrespective of the switching grating inscribed.

The displacement in x,y of the sources $S_n$ and $S_{n+1}$ makes it possible to obtain strata in the photosensitive medium 3 of which the pitch $\Lambda$ is variable as is the orientation $\phi$. This permits illuminating the whole of the medium 3 and it is the modulator 10 which enables selecting the part of the medium 3 in which the two beams Fi coming from the sources will interfere to generate these strata.

Because of the focal distances F separating the plane containing the sources $S_n$ and $S_{n+1}$ from the lens, and separating this same lens L from the photosensitive medium 3, the case of a Fourier transformation prevails in the plane of the photosensitive medium 3. The waves which had been circular upon transmission by the punctiform sources $S_n$ and $S_{n+1}$ became plane waves upon reaching the medium 3. As a matter of fact, the light signals upon incidence on the crystal are the Fourier transformations of the signal upon transmission, and correspond to plane waves comprising a phase factor linked to the inclination of the incident wave on the photosensitive medium 3.

Identical gratings are thus inscribed at different points of the medium 8 with sources $S_n$, $S_{n+1}$ and aperture windows in the modulator 10. The photoemitter circuits selected in this manner will transmit diffracted beams which after focussing by the lens L and reflection on the semi-transparent blade 7 will converge on one and the same point. As a matter of fact, the diffracted beams are mutually parallel upon issuing from the modulator 10.

Figure 10:
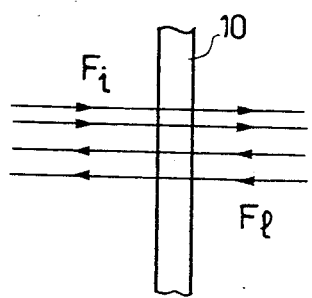

The beams $F_i$ and $F_l$ are transmitted by the modulator 10 as shown in FIG. 10.

Figure 11:
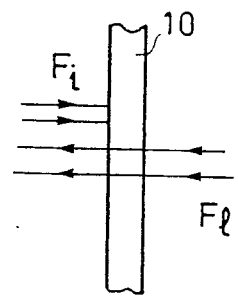

The voltages $V_x$ and $V_y$ are then set at zero as shown in FIG. 11, and the grating is masked against the inscription beams $F_i$. The reading of the photoinduced grating by the beam $F_l$ assured the diffraction of the beam in the direction of the subscriber selected. The reading action at this wavelength has little effect on the photosensitive grating.

The inscription beams $F_i$ of wavelength $\lambda_i$ are then blocked to allow inscribing new interference strata in another area of the photosensitive medium 3. By contrast, the reading beams having the wavelengh $\lambda_L$ are transmitted. The switching grating is erased by applying voltages $V_x - V_y$ and a uniform illumination by means of an inscription source $S_1$, for example. The erasing function may equally be implemented by means of another coherent or incoherent source transmitting within the range of spectral sensitivity of the crystal.

Consequently, the cycle described is valid for any transmitting fibre which may be linked via the switching grid to an optional element of the receptor grid, which may be a matrix of photodiodes or a matrix of optical fibres.

The reading and writing beams may be left in position permanently without impairing the satisfactory operation of the device.

The photosensitive carrier 3 for inscription of the gratings for example, a photorefractive BSO crystal able to operate under an applied field. The electrodes are then produced in the form of interengaged combs to maintain the low voltage values.

The matrix of photoemitter circuits is, for example, a matrix of emitter fibres. The fibres are evenly spaced in $x - y$, the wave coming from these single-mode or multimode fibres is collimated, for example by means of a network of index gradient lenses; the diameter of the beam being on the order of 1 to 2 mms, the receptor matrix may be, depending on application: a matrix of photodiodes, or a network of index gradient lenses connected to optical fibres.

Figure 12:
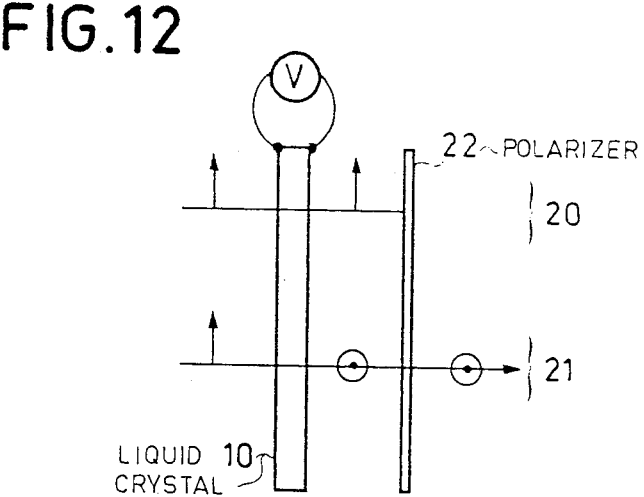
Figure 13:
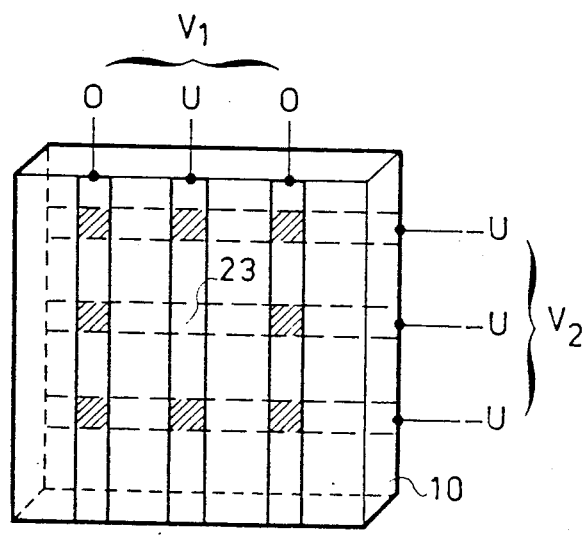

The two-dimensional spatial modulator 10 illustrated in FIGS. 12 and 13 is formed, for example, by a blade of nematic liquid crystal in helix form situated between electrodes exposed to a variable potential V.

It is known that the guiding of a linearly polarized electromagnetic wave by means of a helix is always manifested by a particular "entrainment" of the polarizing plane. There is no synchronous entrainment with the helix however unless the coupling between the wave and the material is sufficiently powerful, which at the same time presupposes a sufficient density of material and a helix pitch distinctly greater than $\lambda$. These two conditions are combined by the coiled nematic which thus renders it possible to perform an adjustment to precisely $\pi/2$ of the rotation of the plane of polarization of a wave transmitted by the cell. To this end, it is sufficient for the directions imposed to the optical axes on the electrodes to subtend a right angle. If a potential difference on the order of one volt is applied to the electrodes however, all the molecules except for those situated in direct proximity to the walls, flip so as to be oriented in the field. The optical activity of the nematic film disappears and consequently so does its rotational power. This mode of operation has three major advantages, which are namely: the low value of the voltages required; these are actually on the order of one volt corresponding to a control power lower than 10 $\mu$W/cm$^2$, the magnitude of the electro-optical action brought into play; a rotation through $\pi/2$ of the plane of polarization, and the very great durability. In exchange, the dynamic aspect is weak, so that this new electro-optical effect lends itself primarily to switching operations.

A first set of parallel electrodes deposited on the lower surface of the crystal, together with a second set of electrodes deposited on the upper surface of the crystal determines a set of points of intersection which may be addressed individually by a matrix addressing method. These electrodes are transparent. For example, they may be produced with a composite oxide of indium and tin.

These electrodes are exposed to a variable potential V such that for V equal to 0 (at 21), the incident polarisation is rotated to 90°.

For V greater than $V_{threshold}$ (at 20) the incident polarisation remains unchanged.

A polarizer 22 having its axis orthogonal to the incident polarization is placed on the output surface of the liquid crystal 10. It is selected to act as a polariser at $\lambda \simeq 500$ nm but has a low rate of polarisation at $\lambda \simeq 800$ nm. The modulator thus has a maximum transmission at $\lambda \geqq 800$ nm.

The selection of a window 23 having coordinates (x,y) is performed by applying the voltages U as denoted in FIG. 13.

By way of a non-limiting example and to clarify matters, it is then possible to consider orders of magnitude of the geometrical dimensions of these different elements of the device of the invention represented in table I situated at the end of this description.

Devices of this kind have a random access period smaller than 10 milliseconds per dot. The inscription of the photoinduced gratings generating the spatial charge field in the BSO material is performed at zero field by diffusion or application of a transverse electric field generated by interengaged combs, for example.

The device proposed thus assured the spatial switching of $10^3$–$10^4$ subscribers, within a shorter period than 10 milliseconds, irrespective of the subscriber in question within the matrix of light sources.

TABLE I

Network of emitter fibres:
diameter of the index gradient lenses: 1.5 to 2 mm
number of emitters: 32 × 32 (1024)
matrix pitch: 2 mm
BSO switching matrix:
surface: 70 × 70 mm²
thickness: 2 to 3 mm
Lens L:
Focal length: F = 60 cms
diameter: φ = 30 cms
Dimension φ of the spot in the plane of the detector matrix:

$$\phi \simeq 300 \ \mu m = \frac{0.8 \times 10^{-3} \times 600}{1.6}$$

Network of detectors:
number of detectors: 32 × 32
pitch of the matrix: 2 mm
Optical power available on the switching plane:
$P_i \simeq 10$ mWcm$^{-2}$
Period of inscription (and erasure) of the grid:
$-\tau \simeq 10$ ms ($S^{-1} \simeq 100 \ \mu Jcm^{-2}$)
Efficiency of diffraction of the photoinduced grating:
$-\eta \simeq 1$ to 10% depending on the amplitude of the field applied ($E_o \simeq$ a few kV cm$^{-1}$)

What is claimed is:

1. A device for switching optical beams for optically connecting at least one of the circuits of a set of photoemitter circuits to at least one circuit of a set of photoreceptor circuits, comprising:

means for generating two inscribing light beams including two punctiform light sources and means for deflecting the optical beams transmitted by the photoemitter circuit previously made parallel by a collimator means, the deflector means allowing direction of the optical beams to the active part of the corresponding photoreceptor circuit and comprising a diffraction grating inscribed in a photosensitive medium obtained by interference of the two inscribing light beams, having a different wavelength from that of the optical beams coming from the photoemitter circuits, the wavelength of the optical beams transmitted by the photoemitter circuit not lying within the range of spectral sensitivity of the photosensitive medium, the photosensitive medium, in which the diffraction grating is a three-dimensional system of strata, being continuously recyclable, the two inscribing light beams being plane wave beams which both uniformly illuminate the photosensitive medium, a two-dimensional spacial modulator being positioned along the path of these inscribing beams between said two light sources and the photosensitive medium, the modulator allowing selection of limited areas in which diffraction gratings are inscribed, said two-dimensional spacial modulator comprising a liquid nematic helix crystal blade inserted between two sets of transparent electrodes deposited on each surface of the blade, the electrodes of each of said surfaces being mutually parallel, and directed at right angles to the direction of the electrodes of the other surface;

a lens positioned in the path of the inscribing beams, the photosensitive medium being positioned at the focus of the lens, and the punctiform light sources being able to be displaced in a plane parallel to the surface of the photosensitive medium passing through the focus of the lens;

a semi-transparent blade situated between the two punctiform light sources and the lens, the semi-transparent blade allowing the two inscribing beams to pass therethrough and reflecting the optical beams coming from the photoemitter circuits after deflection by the diffraction grating; and a polarizer deposited on one of said crystal blade surfaces, the one surface being the output surface for the inscribing beams.

2. A device according to claim 1, in which the two punctiform light sources are derived from one and the same source comprising beam separator means and complementary deflecting means enabling a deflection in two dimensions of the inscribing beam thus generated.

3. A device according to claim 1, in which the photoemitter circuits are arranged in a matrix.

4. A device according to claim 1, in which the collimator means are lenses arranged in a matrix.

5. A device according to claim 4, in which the lenses are index gradient lenses.

6. A device according to claim 1, in which the photoemitter circuits are optical fibers.

7. A device according to claim 1, in which the photoreceptor circuits are optical fibres.

8. A device according to claim 1 in which the photosensitive medium is a blade of monocrystalline bismuth silicon oxide.

9. A device according to claim 1, comprising the same number of photoemitter circuits and photoreceptor circuits.

10. An automatic telephone exchange comprising at least one switching device according to claim 1.

* * * * *